May 25, 1965 W. P. KUSHMUK 3,185,002
LATHE SPINDLE LOCK
Filed May 28, 1963 3 Sheets-Sheet 1
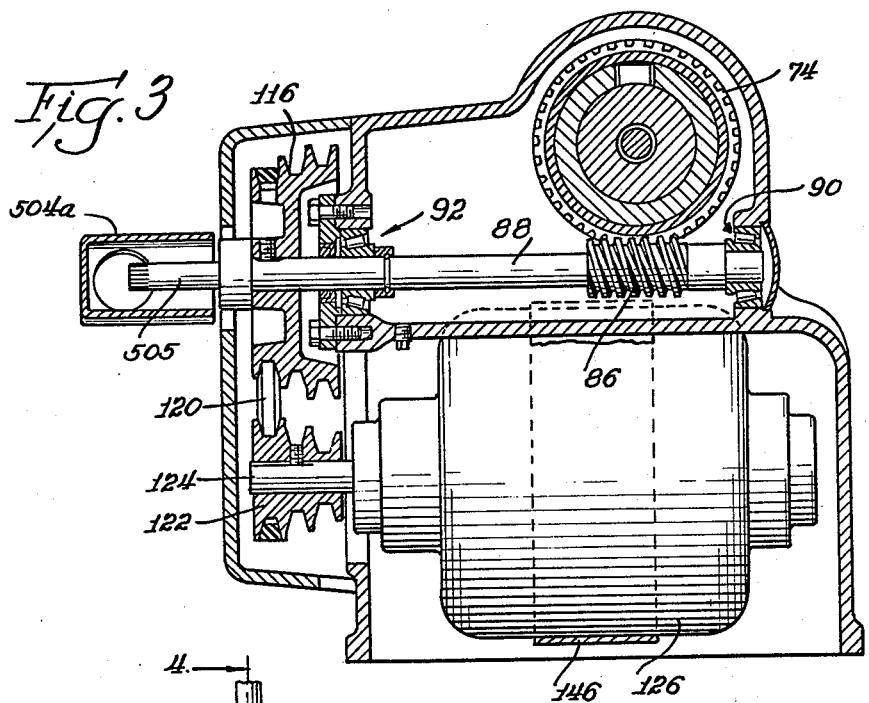
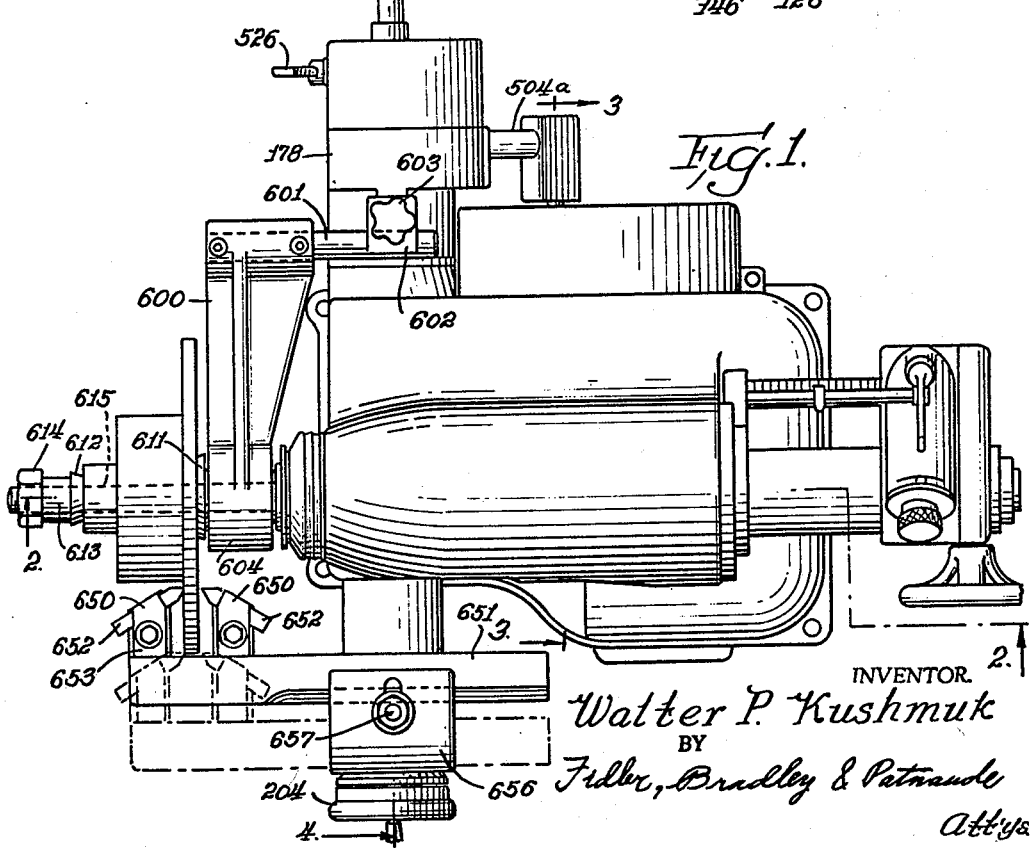
INVENTOR.
Walter P. Kushmuk
BY
Fidler, Bradley & Patnaude
Att'ys May 25, 1965

W. P. KUSHMUK 3,185,002

LATHE SPINDLE LOCK

Filed May 28, 1963

INVENTOR.
Walter P. Kushmuk
BY
Fidler, Bradley & Patnaude
Attys.

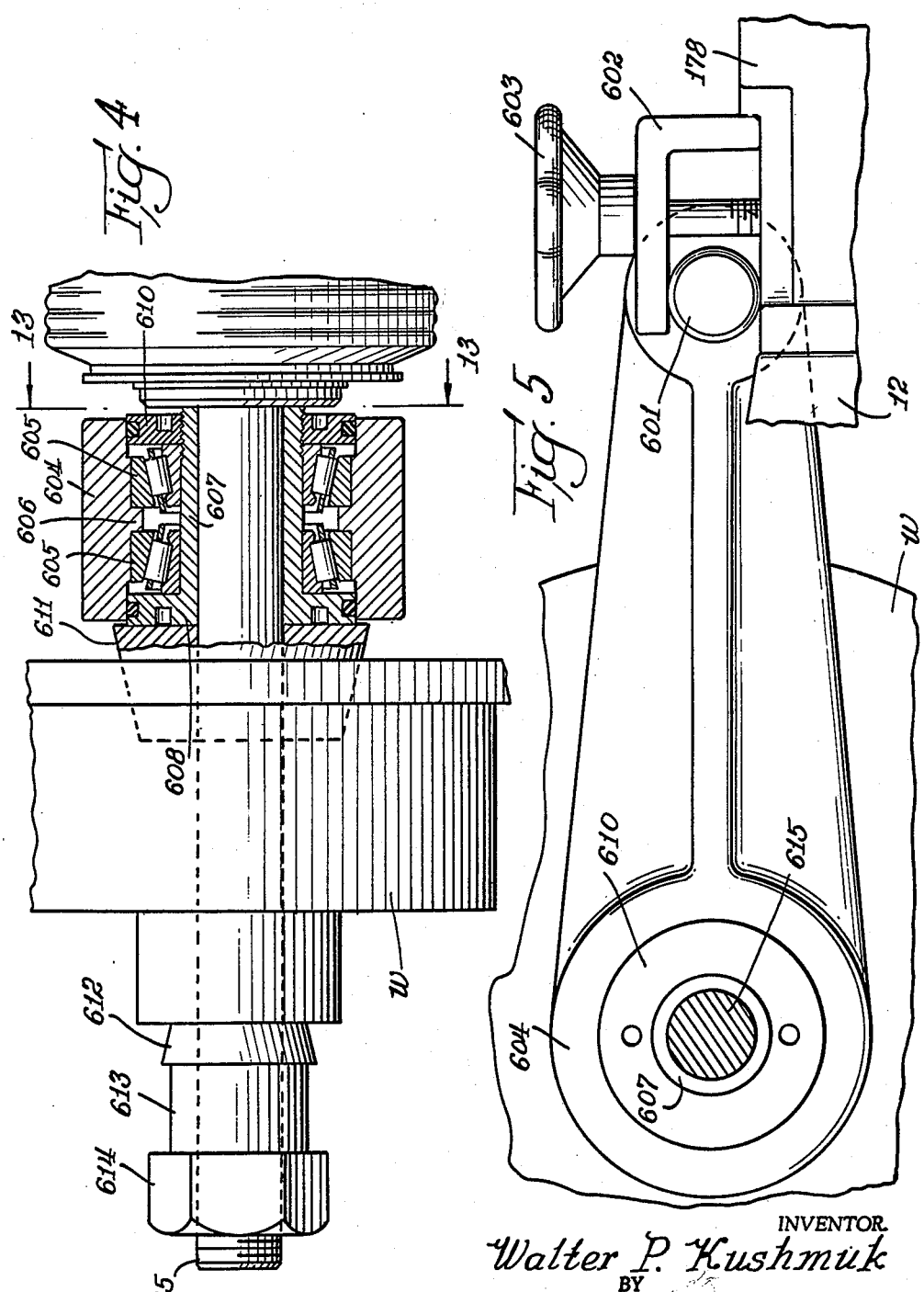

United States Patent Office 3,185,002
Patented May 25, 1965

3,185,002
LATHE SPINDLE LOCK
Walter P. Kushmuk, Niles, Ill., assignor to Ammco Tools, Inc., Chicago, Ill., a corporation of Illinois
Filed May 28, 1963, Ser. No. 283,939
5 Claims. (Cl. 82—2)

This invention relates to lathes and has to do more particularly with a new and improved cutting tool arrangement for a lathe.

Prior art lathes have a spindle which is rotatable and movable axially and a cutting tool which is mounted in fixed position relatively to the spindle so that the cutting takes place by reason of the movement of the workpiece relatively to the tool. The cutting all takes place on the peripheral surface of the workpiece.

It is sometimes desirable that the two opposite faces of a plate-like member or a plate-like flange be machined. One example is the machining of the opposite faces of the flange of a disk brake. It is essential that the two faces of a disk brake be machined to parallelism.

In accordance with the present invention, a tool holder is provided for holding two cutting tools in opposition and with their cutting tips spaced apart in a direction parallel to the axis of the spindle. The arrangement is such that first one tool can be brought into cutting engagement with one face of the workpiece and the corresponding face machined, whereafter the first tool is moved away from the workpiece and the second tool moved into cutting engagement with the second face of the workpiece and the second face machined. It is not necessary to reverse the workpiece to machine the second face and thus the invention insures that both faces will be truly parallel. The invention also provides novel means for moving the cutting tool in a direction radially with respect to the spindle.

An object of the present invention is to provide a new and improved lathe.

Another object is to provide a lathe which will machine the two opposite faces of a disk-like member to true parallelism.

Other objects and advantages of the invention will appear from the following description taken in connection with the appended drawings wherein:

FIGURE 1 is a top plan view of the lathe in accordance with the invention;

FIG. 3 is a sectional view taken along lines 3—3 of FIG. 1;

FIG. 4 is an enlarged elevational view partly in section showing particularly the bearings forming a part of the spindle lock; and FIG. 5 is an enlarged view showing the spindle lock supporting means.

Figure 2:
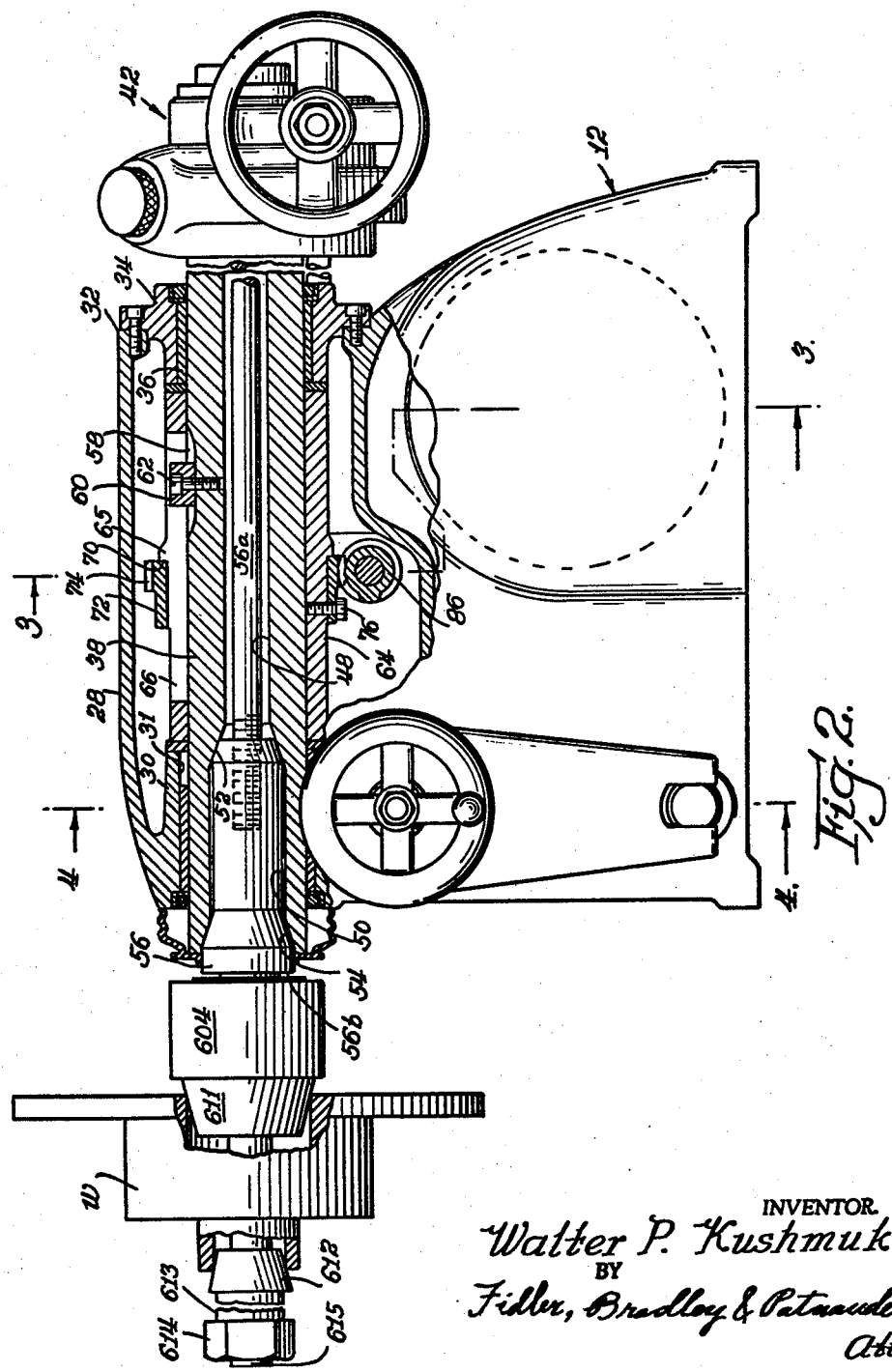
FIG. 2 is a front elevational view partly in cross section of the device of FIG. 1.

Referring now to FIG. 2, the lathe includes a frame or stand 12 on which the other parts are mounted. The casing 12 is formed with an upper portion 28 having aligned openings one of which is surrounded by an internal tubular portion 30 having a bearing bore 31 and extending inwardly toward the opposite end 32. Detachably mounted on the open end 32 is a flanged bearing member 34 having a bearing 36 in axial alignment with the bearing 31. The bearings receive and rotatably support a spindle 38.

The spindle is mounted in the frame for rotational and longitudinal or axial feed movement therein.

The means for effecting rotation of the spindle is a worm 86 (FIG. 3) in mesh with the worm gear 74 mounted on a transverse shaft 88 adjacent the bottom of the gear 74 and mounted in the opposite walls of the casing in bearings 90 and 92. A pulley 122 is mounted on the shaft 124 of the electric motor 126 and connected by a belt 120 to a pulley 116 on the shaft 88. As seen, the belt which is in corresponding grooves in the two pulleys may be moved to the other grooves to provide a different drive ratio. The motor is suitably mounted in a casing by a strap 146.

The spindle 38 is preferably hollow having a small diameter bore 48 terminating in an enlarged diameter portion 50 including an inner tapered portion 52 and outer tapered portion 54, which portions form a double taper for receiving an arbor 56. The arbor carries a draw bar 56a provided with a nut (not shown) at its outer end in order to secure the arbor in the spindle 38. Rotation of the spindle effects similar rotation of the arbor.

The spindle has an axial key way 58 in its periphery for receiving a key 60 which is secured in the key way by appropriate means such as a screw 62 for cooperation with a quill 64 surrounding the spindle. The quill 64 is tubular in shape and is so dimensioned as to have a sliding fit with the spindle. The quill is provided with a slot 66 extending through the wall thereof for receiving the key 60 for relative sliding movement of the key in the slot in response to the axial movement of the spindle while the quill is restrained against axial or longitudinal movement. The quill provides means for imparting rotation to the spindle through the medium of engagement of the key 60 with a side wall of the slot 66 and as the spindle is rotated the feed means produces the axial or longitudinal feed movement of the spindle.

Positioned suitably on the quill 64 intermediate its ends is a circumferential rib 65 having a shoulder 70 against which is abutted a ring gear 72 having worm gear teeth 74 surrounding the quill and secured thereto by suitable means such as the screw 76.

The means for imparting rotation to the spindle includes a worm 86 in mesh with the worm gear 74 and mounted on a transverse shaft 88 adjacent the bottom of the gear 74. Thus, upon rotation of the motor 126, the quill and consequently the spindle are rotated about their common axis. It will be understood that the feed means 42 (not shown) for feeding the spindle axially can be disconnected so that there is only rotary motion of the quill and spindle and no longitudinal feed movement.

The lathe is provided with cutting means including a pair of clamps 650 (FIG. 1) mounted on a cutter bar 651 which clamps are adapted to hold cutting tools 652 with their bits in opposed relation and spaced apart in a direction parallel to the axis of the arbor. Each clamp includes an arm 653 which is integral with the cutter bar and extends laterally therefrom, a clamping member 654, and a bolt 655 which extends through the member 653 and the member 654 and secured by a nut (not shown).

The invention also provides means for locking the spindle against any longitudinal movement, it being understood, of course, that the feed drive for the spindle is disconnected. This locking means includes an arm 600 (FIG. 1) carried by a rod 601 which is clamped against the auxiliary feed mechanism housing 503 by an L-shaped clamp 602 secured by a screw 603 threaded into the lead screw nut 178. The arm 600 has a bearing portion 604 through which the arbor 56 extends. Secured in the portion 604 is a pair of oppositely inclined roller bearings 605 separated by an internal flange 606. Journaled in the bearings 605 is a sleeve 607 which has a flange 608 at its outer end which flange serves to retain the adjacent bearing firmly in place. The other end of the sleeve 607 is threaded and receives a closure nut 610 which closes the bearing portion 604 and firmly holds the adjacent bearing 605 against the flange or rib 606. The threaded (right-hand) end of the sleeve 609 is in abutment with a shoulder 56b on the arbor 56.

The workpiece W is secured on the arbor by a first member 611 (FIG. 4) having a conical outer surface for engaging the bore in the workpiece, a second member 612 having a conical surface adapted to engage the other end of the bore, a spacer 613 and a nut 614 screwed on the threaded end 615 of the arbor. The assembly consisting of the nut 614, spacer member 613, conical member 612, workpiece W and conical member 611, is held in tight contact and the member 611 abuts the face of the flange 608 of the sleeve 607. The sleeve 607 in turn abuts the shoulder 56b on the adjacent end of the arbor so that the workpiece is held firmly on the arbor and against any shifting in a direction parallel to the axis of the arbor.

In the use of the lathe, according to the present invention, the workpiece is secured on the arbor as seen particularly in FIGS. 2 and 4 with the inner end of the sleeve 607 firmly abutting the shoulder on the arbor. The workpiece is installed on the arbor. Thereafter the cutting tools 652 are brought opposite the flange on the workpiece. However, the tools are adjusted so that only one tool is in engagement with the workpiece flange at one time. The cutter bar thus is adjusted so that one bit engages the adjacent face of the workpiece flange toward the center. The electric motor is then energized which rotates the quill 38 and the arbor carrying the workpiece. Upon energization of the electric motor, the cutting tool which is engaged with the workpiece moves outwardly and machines the adjacent surface of the flange. When the machining operation has been completed, the lathe is halted and the cutting tools 652 are moved outwardly beyond the workpiece of the flange. Thereafter, the cutter bar is adjusted so that the first cutting tool 652 is moved to a position where it will not engage the flange and the other cutting tool is moved into a position where it will engage in cutting relation with the face of the flange opposite to the face which has just been machined. Thereafter, the machining operation is carried out to machine the second face of the flange of the workpiece.

For the purposes of illustration, the invention is disclosed in connection with a lathe such as is disclosed in United States Patent No. 2,891,435 to Henry Robert Billeter, but it will be understood that it is not limited to use in connection with such lathe. Certain features disclosed but not claimed herein are disclosed and claimed in my co-pending application Serial No. 283,886, filed May 28, 1963.

I claim:

1. A lathe comprising a base, workpiece carrying means rotatably supported by said base and having an outwardly facing exposed shoulder, a rigid member rigidly supported on said base, a sleeve journaled in said rigid member and receiving said workpiece carrying means therethrough and means for clamping a workpiece on said workpiece carrying means relatively to one end of said sleeve and for clamping the other end of said sleeve against said shoulder.

2. A lathe as claimed in claim 1 wherein said sleeve has a flange on the end away from said shoulder and said clamping means engages said flange.

3. A spindle lock for a lathe of the type including a base, workpiece carrying means rotatably supported by said base and having an outwarddly facing shoulder, said spindle lock including a rigid arm, a sleeve journaled in said arm and having a bore therethrough for receiving said workpiece carrying means therethrough, means for clamping a workpiece relatively to one end of said sleeve and for clamping the other end of said sleeve against said shoulder and means adapted to rigidly support said arm on said base.

4. A lathe comprising a base, a spindle rotatable in said base, means for rotating said spindle, an arbor carried by said spindle and rotatable therewith and having an exposed shoulder, an outwardly facing shoulder, a rigid member rigidly supported on said base and carrying bearing means, a sleeve journaled in said bearing means and receiving said arbor therethrough, and means for clamping a workpiece on said arbor relatively to one end of said sleeve and for clamping the other end of said sleeve against said shoulder.

5. A lathe as claimed in claim 4 wherein said bearing means includes a pair of conical bearings inclined in opposite directions.

References Cited by the Examiner
UNITED STATES PATENTS

| 2,371,465 | 3/45 | Olsson | 82—28 |
| 2,891,435 | 6/59 | Billeter | 82—2 |

WILLIAM W. DYER, Jr., *Primary Examiner.*